Aug. 9, 1966 A. AKSU 3,265,829

PROGRAMMING DEVICE AND SYSTEM

Filed Oct. 1, 1963 6 Sheets-Sheet 4

Aug. 9, 1966 A. AKSU 3,265,829

PROGRAMMING DEVICE AND SYSTEM

Filed Oct. 1, 1963 6 Sheets-Sheet 5

3,265,829
Patented August 9, 1966

3,265,829

PROGRAMMING DEVICE AND SYSTEM

Akin Aksu, Harrisburg, Pa., assignor to
AMP Incorporated, Harrisburg, Pa.

Filed Oct. 1, 1963, Ser. No. 312,981
20 Claims. (Cl. 200—111)

This invention relates to an improved electro-mechanical switch and to a system using the improved switch to selectively connect conductive paths.

In computers, office equipment and the like a particular function is achieved by causing particular patterns of sub-components to be electrically interconnected. This procedure, frequently termed programming, is now carried out by the manipulation of manual switches capable of making or breaking numbers of contact paths formed in desired patterns by patchcords. A typical switch or plugboard used for this purpose is shown in U.S. Patent Number 2,882,508 granted April 14, 1959 in the name of W. S. Watts. As will be apparent from the description in the patent, desired patterns of contact paths are effected by selecting appropriate positions in a movable panel and inserting patchcords carrying contact members which engage complementary contact springs carried in a fixed board, upon operation of the device to "close" the plugboard. The basic shortcoming of the plugboard is that it is totally manual and cannot therefore be programmed remotely or automatically.

The present invention contemplates as a basic object the provision of a programming system overcoming the limitations of manual plugboard devices. As a further object, the invention contemplates the provision of a programming system made up of numbers of switches of a novel construction to permit remote and automatic control by non-complex signals developed from standard power supplies. Another object is to provide an assembly of switch modules in conjunction with a circuit and packaging scheme having a favorable parts per system ratio for both ease of use in systems of different sizes and overall system reliability.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

Figure 1:
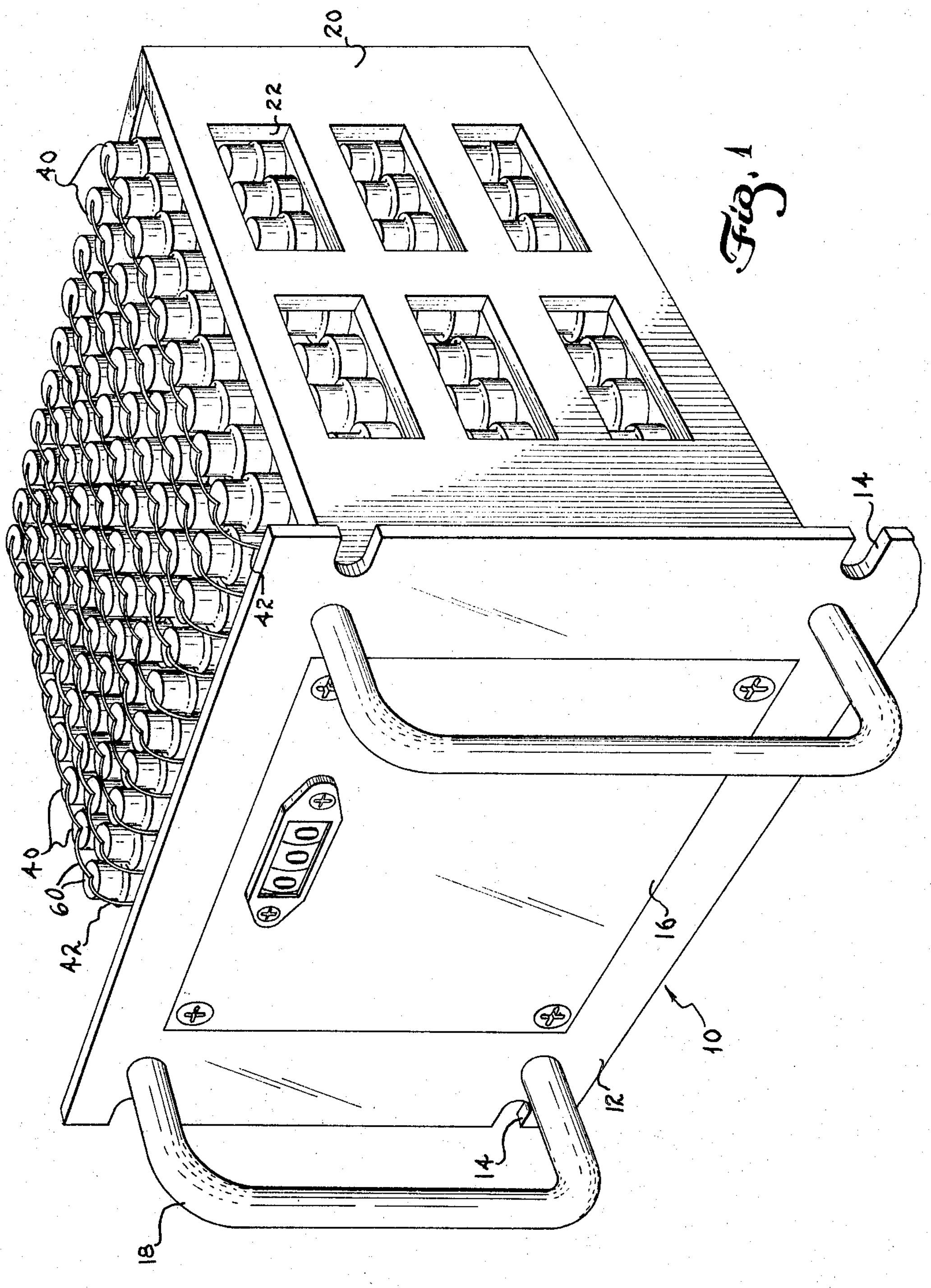
FIGURE 1 is a perspective of the assembly of the invention consitituting a mounting rack containing numbers of the novel switches of the invention wired for programming use.

FIGURE 1 depicts a programming system assembly 10 which is adapted to be drawer mounted in a support receptacle not shown. Assembly 10 is comprised of a front 12 suitably cut out as at 14 to receive drawer locking members secured to the drawer receptacle. A panel 16 is provided in front 12 to permit access to auxiliary components which serve the various switch racks within the assembly. Handles 18 secured to front 12 permit assembly 10 to be manipulated for positioning into and out of the receptacle.

Figure 2:
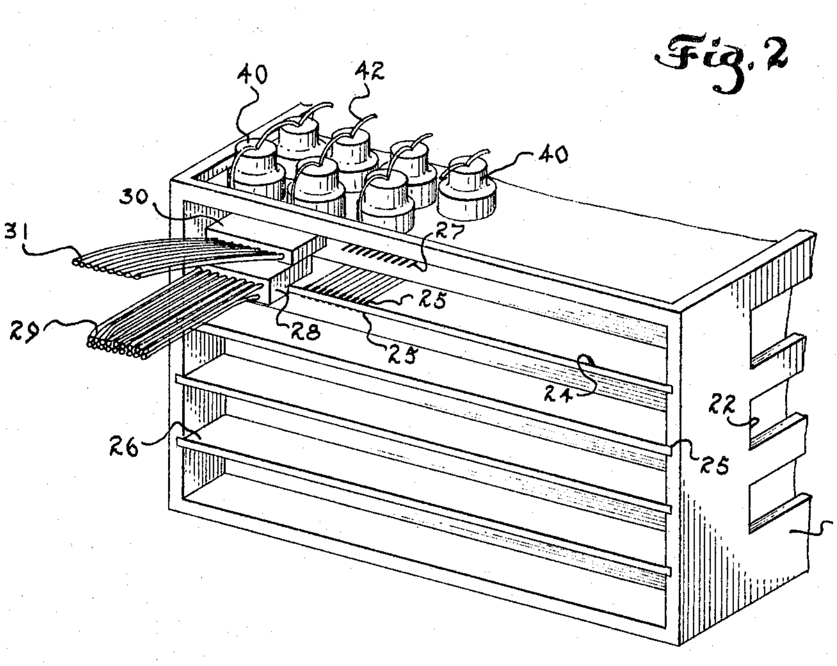
FIGURE 2 is a rear perspective view of the assembly of FIGURE 1 showing an exemplary means for interconnecting the signal and control paths thereof.

Secured to front 12 is a chassis 20 apertured as at 22 to both lighten the assembly and ventilate the various switch rack levels supported and retained therein. FIGURE 2 shows the rear of chassis 20 and the end portions of four switch rack levels, the top and bottom levels being numbered 24 and 26, respectively. As indicated at 25, the sides of chassis 20 are grooved to receive the rack levels which may be withdrawn in the manner indicated by the dotted lines associated with level 26. In a preferred construction the front 12, panel 16, handles 18 and the outside frame of chassis 20 are of aluminum stock and the assembly switch racks are formed of reenforced insulating sheet material such as laminated phenolic resin.

As depicted in FIGURE 2, each switch rack level incorporates a number of contact paths of conductive material including, as indicated relative to level 24, paths 25 on the top and bottom surfaces of the insulating board and paths 27 shown as pins extending from a panel recessed from the level end and vertically mounted on the level surface. Each path 25 extends along its board level to interconnect with one switch of the number of switches of the level to provide signal input-output leads. Each two paths 27 serve to interconnect with a single switch to provide switch control power signals. It has been found that standard etched or printed circuit type paths such as 25 are sufficient for signal channels but heavier plated or solid conductor paths are preferred for switch control power. The details and criteria for the foregoing will become apparent from the description of the system to follow.

Each group of signal paths 25 is served by a connector such as 28 having distinct leads such as 29 connected to sub-components of a computer or other devices to be programmed. The control power signals are served through a connector such as 30 adapted to engage and interconnect the pins of paths 27 with leads such as 31, in turn connected to peripheral switch drive equipment. Connector 28 may be of the type described in U.S. Patent No. 3,173,737 to R. J. Kinkaid et al., filed August 5, 1963 and connector 30 may be any suitable multiple pin and jack connector.

From FIGURES 1 and 2 it can be seen that each switch rack level contains a number of separate switches 40 disposed in rows and columns with the switches of a given column interconnected by a lead such as 42 which serves to apply switch control power. Other control power leads (not shown) are connected to individual switches in a manner to be described hereafter. The assembly 10, through the switches 40 thereof as driven by peripheral equipment, is capable of automatically and remotely, if desired, interconnecting one or several inputs to one or several outputs in a manner analogous to the manual plugboard of the prior art.

Figure 3:
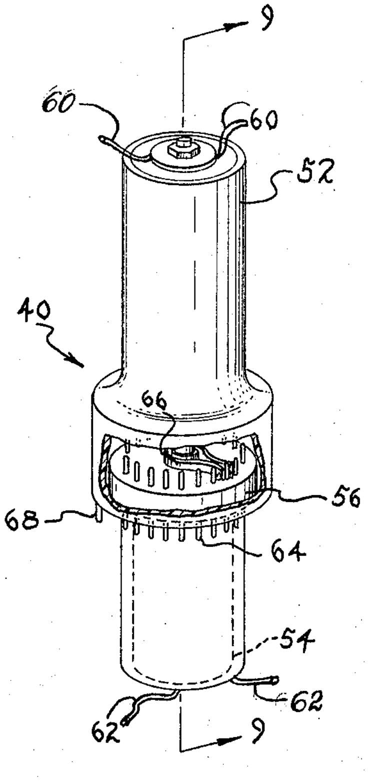
FIGURE 3 is a perspective of the embodiment of the switch of the invention shown in FIGURE 1.

The basic part of the invention which permits the above capability in a form which is feasible with regard to both production and space requirements is the compact multi-contact switch 40 shown in FIGURE 3. The preferred construction of 40 includes a first outer casing 52 housing a rotary switch drive and a second outer casing 54 housing a vertical switch drive. Casings 52 at 54 are interlocked through an insulating contact disk 56 in a manner to be described in detail relative to FIGURES 9 and 10. Casings 52 and 54 are preferably of metal and disk 56 is of Teflon and the unit formed thereby is hermetically sealed.

Switch drive is supplied through a rotary input lead tap 60 and a vertical drive tap 62, disposed at the top and bottom centers of the switch respectively, and leading through the switch casing to windings therein. Extending through disk 56 are contact pins 64 disposed in circular fashion inside casing 52 to cooperate with a switch arm 66 (shown in the engaged or down position), and outside of the casing to engage conductive paths linking similar pins of other switches. An input pin 68 is also provided and interconnected with arm 66 via an internal lead brush not shown. An alternative arrangement is contemplated wherein the switch input connection is made via a separate lead and path from one end of the switch.

Switch 40 operates to effect a connection between a signal input via pin 68 to any one of the pins 64 and the circuits connected thereto. This is accomplished by first driving arm 66 around in a controlled manner to select a given pin 64 responsive to control pulses applied via tap 60 and the switch rotary drive, and then driving arm 66 downwardly to engage the selected pin responsive to control pulses applied via tap 62 and the switch vertical drive.

Switch 40, as shown in FIGURE 3, includes a construction to be hereafter detailed which permits the above function to be effectuated responsive to relatively few and simple control pulses. The construction further constitutes a switch assembly which is both compact and capable of providing reliable, low resistance paths between one and a number of input and output leads.

Figure 4:
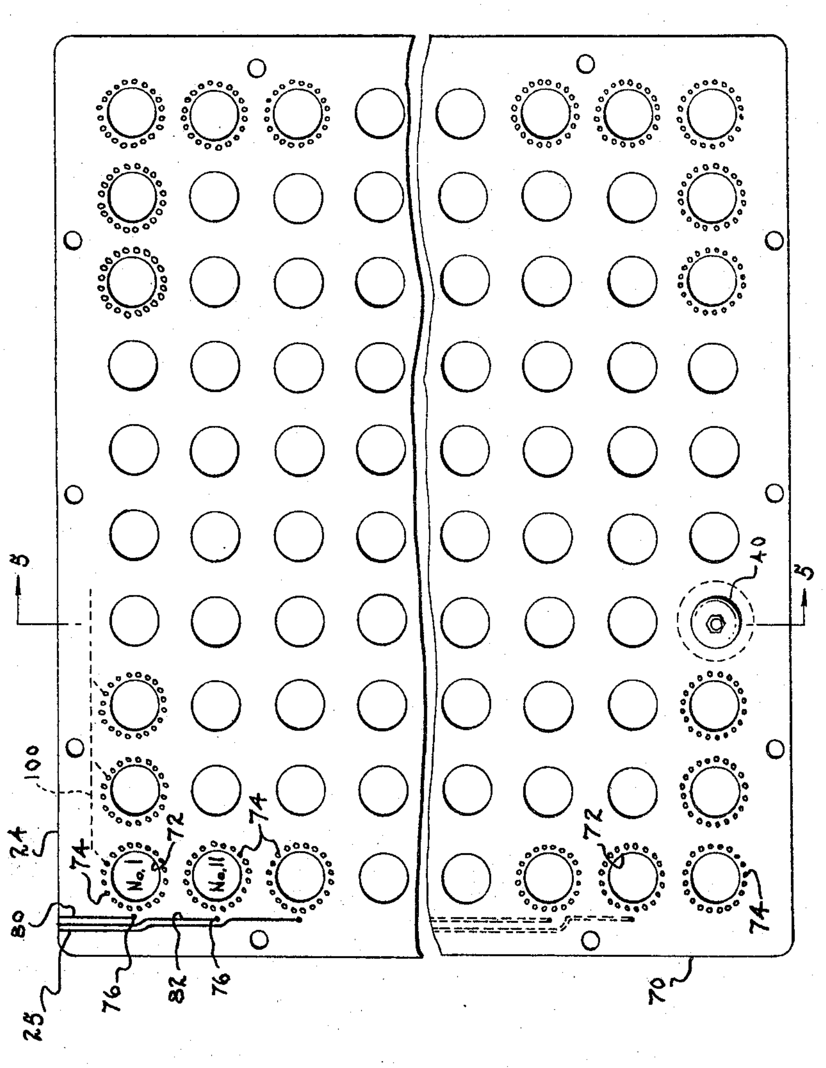
FIGURE 4 is a fragmentary plan view of one embodiment of a circuit board for use in the assembly of FIGURE 1.

Referring back to FIGURES 1 and 2, and now to FIGURES 4 and 5, one embodiment of the interconnection scheme of the invention will now be described. The board 70 is the base of a switch rack level upon which switches 40 are mounted. The rear edge of board 70 is shown as 24 to reference FIGURE 2 and the board orientation there depicted.

Figure 5:
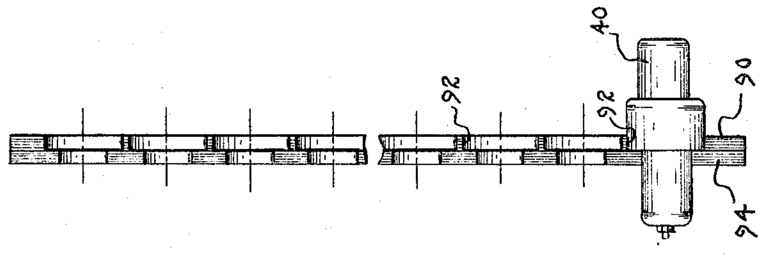
FIGURE 5 is a sectional elevation along lines 5—5 of FIGURE 4.

Disposed in board 70 are a number of apertures 72 arranged in matrix fashion to each accommodate the insertion of a switch 40, one being shown in FIGURE 5. Surrounding each aperture 72 are a plurality of smaller apertures 74 sized to accommodate the pins 64 which protrude from each switch 40, and a further aperture 76 sized to accommodate an input pin 68 of each switch. This arrangement permits each switch to be "plugged" into board 70 in the proper orientation. In one circuit embodiment, the interconnections brought into board 70 are via conductive paths disposed as shown in FIGURE 4 on the bottom and top surfaces of the board leading to connection points such as 25 to be connected as indicated in FIGURE 2. For each switch position there is provided one input so served. Thus, switch position No. 1 is served by a path 80 and position No. 11 is served by a path 82.

Figures 6, 7, 8:
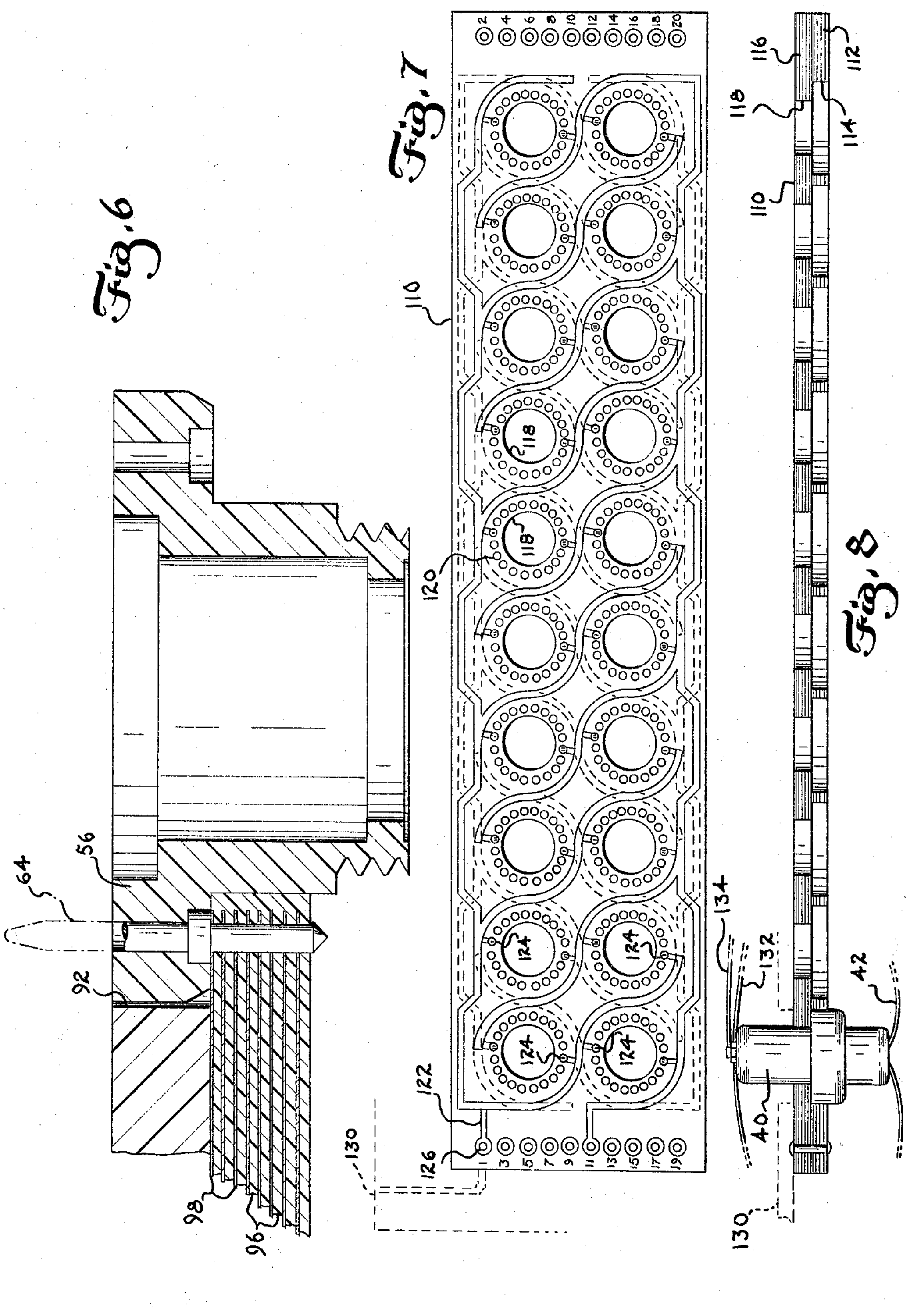
FIGURE 6 is an enlarged sectional elevation along lines 6—6 of FIGURE 5.
FIGURES 7 and 8 are plan and sectional elevations, respectively, of an alternative embodiment of a circuit board for use in the assembly of FIGURE 1.

Board 70 is comprised of a stiffening member 90 of sheet insulating material apertured as at 92 in FIGURES 5 and 6 to receive switch 40. Bonded to member 90 is a further board 94 which is comprised of laminations of insulating material 96 and conductive paths 98 as best shown in FIGURE 6. In a preferred embodiment each level of the conductive paths of member 94 contains two or more non-overlapping networks of paths each associated with common pin positions for each switch position. FIGURE 4 shows one such network 100 connecting the same relative pin of a plurality of switch positions. Through this, each switch and its input lead may be connected directly to any one of as many other switches as there are pin positions per switch, and as will be described, indirectly to further switches. Thus, in the example of FIGURE 4, switch No. 1 and the lead 80 may be connected to any one or all of twenty other switches by manipulating the switches to be connected with commoned paths such as 100. Computer sub-components individual to each switch can then be connected in a desired pattern or program.

In an alternative arrangement each of the switches 50 may be connected to an input lead and the conductive paths associated with each pin position such as 74 connected in groups to different outputs. In this manner the number of external leads which may be handled by the system is extended. FIGURES 7 and 8 better illustrate the foregoing in showing an alternative embodiment of switch level board construction. This embodiment, in effect, breaks the board above described into segments each accommodating a lesser number of switches. This permits flexibility in design to efficiently accommodate programming systems having different requirements as to numbers of components. The board 110 shown in FIGURES 7 and 8 could thus be used by itself to accommodate twenty leads or less, or in large numbers to accommodate multiples of twenty. The construction of board 110 is identical to that of board 70 heretofore described. Thus, a stiffening member 112 is provided with apertures 114 sized to each receive the upper portion of a switch 40. Bonded thereto is a laminated circuit member 116 apertured as at 118 to receive the lower portion of the switch. Each major aperture 118 is surrounded by minor apertures 120 individually connected to constructive paths such as path 122 shown linking apertures 124 to top point 126. If numbers of boards 110 are utilized to make up an array of switchboards, the individual boards are preferably mounted and connected to a common board 130 shown dotted in at the left of FIGURES 7 and 8. This common board serves to provide a mounting arrangement similar to board 24 shown in FIGURE 2. Circuit connections may be provided in the same manner as indicated in FIGURE 2.

Each switch 40 secured in board 110 includes a rotary drive lead 42 as above explained. Additionally included is a vertical drive lead 132 and a switch input lead 134 both terminated to the bottom of switch 40.

With the board 110 and twenty switches 40 each having a separate input lead such as 134, a variety of circuit capabilities may be accomplished. For example, any one of twenty inputs may be connected to an one or all of twenty outputs, the numbered taps for each path and pin being connected separately through output leads to computer sub-components. Further, each input from a switch 40 may be connected to a different output via a given pin position and tap such as 126 connected to the first pin of each switch.

Figure 9:
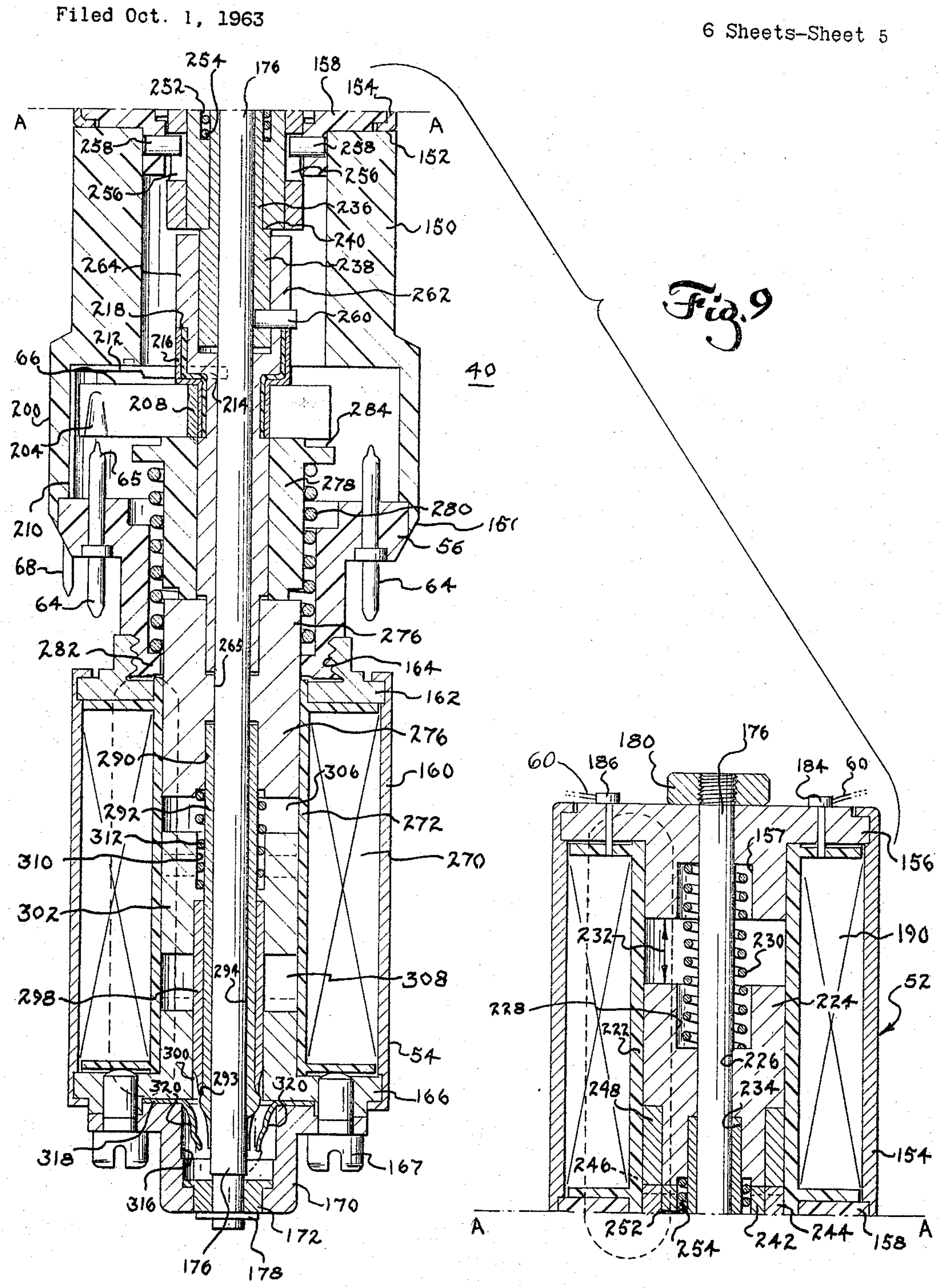
FIGURE 9 is a sectional elevation of the switch of the invention taken along lines 9—9 of FIGURE 3.
Figure 10:
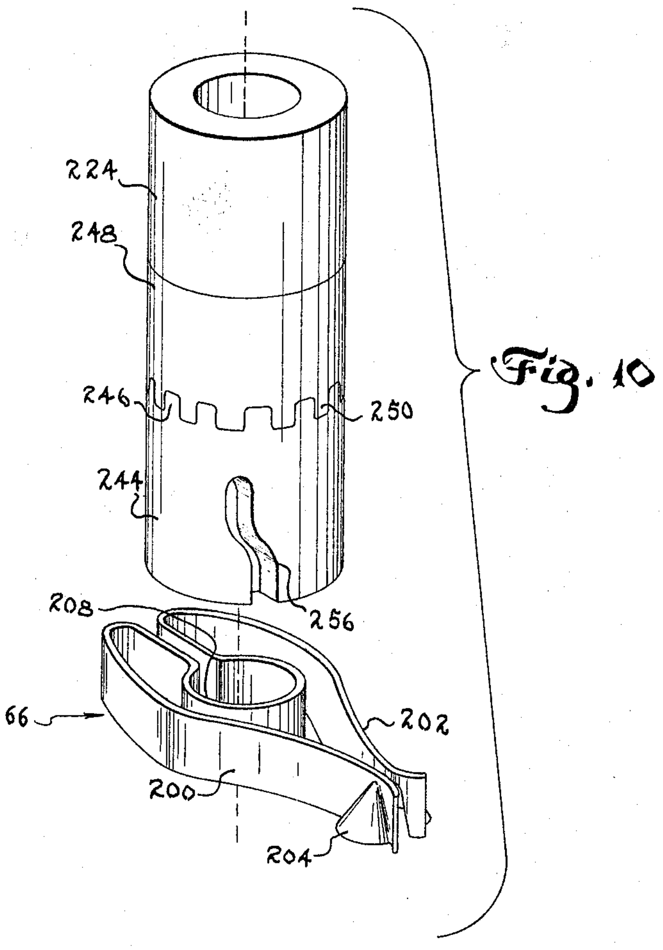
FIGURE 10 is a perspective of portions of the switch of FIGURE 9.
Figure 11:
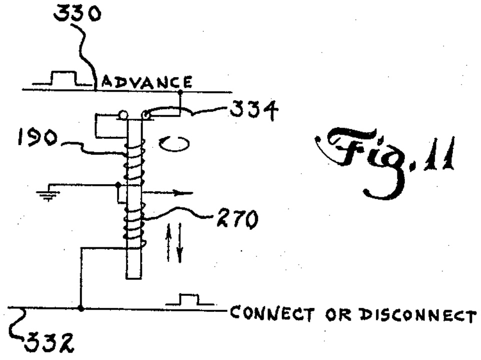
FIGURE 11 is a schematic wiring diagram of a two terminal circuit for the switch of the invention.

As above mentioned, the basic part of the system is switch 40 and its construction which permits a controlled selection of contact paths responsive to non-complex control signals. FIGURES 9–11 will now be referred to for a detailed description of a preferred switch embodiment having the characteristics and capabilities of the switch 40 described with respect to FIGURE 3. Referring generally to FIGURE 9, the switch casing 52 is comprised of lower sleeve 150 having an enlarged diameter end 151 bonded to disk 56 and the upper end 152 is bonded to an upper sleeve 154 formed to join and interlock with further disks 156 and 158. Switch casing 54 includes a sleeve 160 formed at the ends thereof to join disks 162 and 166. Disk 162 includes an integral extension internally threaded as at 164 to engage complementary threading on disk 56. Secured to disk 166 as by screws 167 is an end cap 170 having a central support ring 172 fixed thereto to receive a shaft 176 which extends through the center of both casings 52 and 54. Shaft 176 is slotted to receive an "*e*"

ring 178 to lock the shaft against withdrawal. The opposite end of shaft 176 is threaded to receive a nut 180 adapted to be tightened down to hold the various casing shells and disks together in an integral assembly bearing against the central disk 56.

As above described, the switch 40 is hermetically sealed with input and output signal paths formed by pins 64 and pin 68 extending through disk 56. Control power signal paths are provided to the two solenoid coils of the switch by leads extending from the taps 60 and 62 through the end disks 156 and 166, respectively. This is shown relative to tap 60 by the leads 184 (into) and 186 (out of) the rotary drive solenoid coil 190; the leads for the vertical drive solenoid being similarly arranged. As can be seen from FIGURES 3 and 10, the selective operation of switch 40 is achieved by mechanically driving contact spring arm 66 around and down to engage a particular pin 64; the electrical path being then from the input circuit path to pin 68, to arm 66, the selected pin 64 and the output circuit path in board 70 or 110. Contact arm 66 is formed of flat sheet conductive material of spring grade alloy and includes double contact fingers 200 and 202 each having a tapered lower portion such as 204 shown with respect to finger 200. The tapered opening formed thereby operates to assure that the pin member will be properly engaged as the arm is driven downwardly, even in the presence of production or wear tolerance deviations of pin and arm. The top of each pin 64 includes an introductory taper 65 to further assure proper engagement. At least the interior surfaces of arms 200 and 202 and the surface of each pin 64 are suitably plated to provide good contact characteristics and long life. The contact fingers are each supported by a length sufficient to define a resiliency providing adequate but not excessive contact pressure between contact surfaces, again in the presence of expected tolerance deviations. As can be seen from FIGURE 10, arm 66 is of one piece to include a support ring portion 208 adapted to lock against and in contact with the supporting drive shaft.

In the embodiment shown in FIGURE 9, contact with arm 66 is made via pin 68 through a conductive path 210 to a brush 212 anchored to casing shell 150. Brush 212 includes contact spring arm 214 which rides on a contact member 216 locked to an insulating ring 218 supported on the arm drive shaft. In an alternative embodiment the switch signal input may be carried along a conductive path through or around shaft 176 to engage in sliding contact the interior of ring 208 of arm 66.

With the contact operation in mind, the rotary drive mechanism will now be described. Viewing the upper part of FIGURE 9 and FIGURE 10, a single solenoid coil 190 is provided on a coil frame 222 held in 52 with an electromagnetic axis as indicated. As will be hereinafter made apparent, coil 190 is adapted to be pulsed to supply pulses of magnetomotive force resulting in distinct rotary steps of switch arm 66. This type of solenoid coil is both simple and inexpensive to manufacture and can be made quite small due to the requirements of the switch. Centered within the coil frame 222 is a slug of magnetically permeable material such as soft iron which forms an armature or plunger 224 adapted for sliding movement relative to the frame. The interior of 224 includes a bore 226 to fit against and be supported for sliding movement by shaft 176. A further and larger bore 228 is provided in the upper end of 224 to seat and accommodate a compression spring 230 coaxial to shaft 176 and having the upper end thereof nested within a bore 157 of disk 156 in bearing relationship thereagainst. Plunger 224 is shown in the rest or open position to define a space 232 from the lower face of 156; which space in turn defines the limit of plunger travel. Plunger 224 includes a lower bore 234 into which is fitted a sleeve 236 fixed to the plunger but free from shaft 176 for relative sliding movement. Sleeve 236 includes an enlarged lower end 238 defining a face 240 which engages a soft iron core 242 secured to a sleeved cam 244, both coaxially disposed around shaft 176 and the upper portion of sleeve 236 for sliding movement relative thereto. The upper portion of cam 244 includes a series of teeth 246 better shown in FIGURE 10 adapted to engage and mate with teeth 250 on the lower surface of a ring 248 secured to plunger 224. The interior of core 242 includes a stepped bore 252 housing a further spring 254, in compression as shown to tend to force plunger 224 and the core-arm assembly apart. Spring 254 is sufficiently weaker than spring 230 to leave the teeth 246 and 250 engaged while the switch is deenergized.

Cam 244 further includes slots 256 on either side thereof which define cam surfaces to impart rotary motion to the cam-plunger assembly by engagement with pins 258 fixed in the lower portions of disk 158. The lower portion 238 of sleeve 236 carries a pin 260 adapted to engage a vertical slot 262 in the upper portion of the sleeve 264 to which contact arm 66 is attached.

In operation a pulse applied via tap 60 will then energize coil 190 developing a magnetomotive force to drive plunger 224 and core 242 upwardly against the face of disk 156. As this occurs the engagement between teeth 246 and 250 will be maintained and the rotary movement imparted by the reaction of cam slots 256 to pins 258 will cause the plunger-cam assembly including portion 238 and pin 260 to step around. Shaft 264 is at this time held against vertical movement but pin 260 in sliding in slot 262 operates to drive the shaft and arm 66 around a corresponding step. In the twenty pin switch above depicted this step would be 18° as defined by the circular travel of cam 246, in turn defined by slot 256. As the energizing pulse dies away, spring 256 will force the cam downwardly with teeth 246 being disengaged from teeth 250 of the plunger ring 248. Cam 244, will in its downward movement rotate back to its original position, the plunger 224, sleeve 236 and arm 66 remaining advanced. Spring 230, then in full compression, will operate to drive the plunger downwardly to reengage teeth 250 with teeth 246 to complete one rotary step per one engaging pulse. By appropriate shaping and control of teeth 246 and 250, an exact arm position can be maintained relative to each contact pin 64. To provide long life with reduced wear the bearing and direct engaging surfaces are preferably carried in separate metallic members; i.e., in ring 248, and separate cam ring 244. It is, however, contemplated that certain simplifications can be achieved at some sacrifice of switch life by having integrally bonded Teflon or nylon pieces rather than metal members, the soft iron members, of course, being the same.

The foregoing details how the switch of the invention is driven in rotary steps to selectively position contact arm 66 over pins 64. Each switch includes a normal or initial arm position as, for example, over the same relative pin. The common application of rotary drive pulses will then step each switch pulse-by-pulse to distinct and identical pin positions. The application of a vertical drive pulse will then effect arm closure with the selected pin. This operation is accomplished by means of a further solenoid coil 270 secured in a frame 272 in a manner similar to that above described. The electromagnetic axis of coil 272 is as indicated to develop a magnetomotive force on a soft iron plunger 276 secured to sleeve 264 through a lower extension having a bore 265 permitting sliding movement relative to shaft 176. The upper end of plunger 276 is seated against a bushing 278 having an outer diameter to accommodate a compression spring 280 bearing against an internal flange 282 of disk 56 and a flange 284 of the bushing. Spring 280 tends to force bushing 278 and arm 66 upwardly to hold the arm in the position shown.

The lower end of plunger 276 is bored as at 290 to receive and be secured to a sleeve 292, itself having a bore 294 sized for sliding movement relative to shaft 176. Surrounding 292 is a further sleeve 298 adapted to slide thereover. Sleeve 298 includes a bevelled end 300 which engages a flange 293 on the end of sleeve 292. The upper end of sleeve 298 is secured to a second plunger 302 adapted for sliding movement relative to sleeve 292 and plunger 276. Plunger 302 is of a length to define an air gap 306 between plungers in the open or rest position of the switch and a lesser air gap 308 between itself and disk 166 which is of soft iron. Plunger 302 is bored as at 310 to receive a compression spring 312 which tends to force the plungers apart.

At the lower end of casing 54, cap 170 includes a cavity 316 housing a latching spring 318 held between the cap and insert 166. Spring 318 includes four spring fingers 320 of the configuration shown having a relaxed position to define an end face in the path of travel of flange 293.

The operation of the vertical drive is as follows. Responsive to a single drive pulse to solenoid coil 270, plungers 276 and 302 are driven downwardly and at the same time together to sequentially close in gap 306 and then 308. The sleeve 292 is forced by this action downwardly and the flange 293 passes through and parts fingers 320 which snap inwardly. Since plunger 302 is against plunger 276 during the downward travel, sleeve 298 is relatively withdrawn such that end 300 is spaced from flange 293. The fingers 320 may then snap inwardly over flange 300 against the body of sleeve 298. This operates to lock sleeve 298, plunger 276, sleeve 264 and arm 66 downwardly with contact thus being made between an input and a selected pin 64. As the drive pulse ceases, spring 312 will force plungers 276 and 302 apart to redefine the air gap 306. The position of plunger 302 through sleeve 298 will be such as to redefine the air gap 308, now smaller than air gap 306.

As an important point, switch 40 in closed contact as above described, need not be supplied with holding power. This permits the coil 270 to be much less expensive, since it need only have characteristics for intermittent operation rather than continuous duty.

To restore switch 40 to the open position with arm 66 prepared to be driven in rotary fashion, a second pulse is applied to coil 270 which is identical to the pulse applied for closure. Now, since air gap 308 is less than 306 the plunger movement will be downward with plunger 302 first closing against disk 166 followed by slight movement of 276 downwardly. The beveled end 300 of sleeve 298 will force fingers 320 outwardly and 300 will be interposed to prevent flange 293 from catching on the finger ends. With the cessation of the actuating pulse, spring 280, compressed during the downward travel will restore the switch to the open position, clearing arm 66 from contact with pin 64.

From the above it will be apparent that rotary and vertical switch movement can be achieved responsive to single D.C. pulses. The pulse configuration is not complex nor is its duration critical. The pulses to open or close are identical and no holding power is required.

The switch of the invention may be supplied by a number of different circuits. It may be used in multiple in the manner above described or singly if so desired. A simple circuit for either use is shown in FIGURE 11 wherein the rotary drive coil 190 and the vertical drive coil 270 are shown schematically with respect to a representation of the plungers driven thereby. Through a suitable switch drive selecting device, not shown, an appropriate rotary lead such as 330 is engaged and supplied with pulses in number equal to the number of steps desired. The coil 190 will be energized to drive the switch to a pin position analogous to the number of steps. Thereafter by means of a selecting device not shown the appropriate vertical drive lead 332 is engaged and supplied with a single unipolar pulse to energize coil 270. This will drive the switch to close its contact arm on a selected pin. To clear the switch a further application of a single pulse to lead 332 will again operate to energize coil 270 and return the switch arm to the upward or open position. Thereafter, the application of a number of pulses to lead 330 equal to the difference between the total number of pin positions and the number of the initial set of stepping pulses will drive the switch back to the normal position. Numerous switches may thusly be driven by providing leads such as 330 individual to each switch and leads such as 332 common to all switches. Alternatively, both leads 330 and 332 may be common to a number of switches with a means to break the input from lead 330 to coil 190 as indicated by contact points 334. With this embodiment, a coordinate selector scheme may be used which first commonly steps all switches and then drives only certain selected of the switches vertically to thus separate the selected switches from the common rotary drive. Thereafter the remaining switches may be further driven to selected pin positions and caused to engage.

In all of the above uses, the switch of the invention does not wipe contact paths except when selected. This feature makes for long switch life through reducing contact surface wear. Additionally, it permits a controlled isolation of scanned but not selected switch contact pins. The improved features of the switch are inherent in the system of the invention as above described.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. An improved programming system comprising in combination, a switch rack including a frame mounting at least one rack level, a board member fitted in said rack level, the said board member having disposed therein a matrix of major apertures forming switch positions to receive the body of a switch with each major aperture surrounded by a plurality of minor apertures each linked to conductive paths disposed on and in said board member, a plurality of switches each including a rotary contact selecting drive and a contact arm normally spaced from a plurality of contacts, a vertical drive connected to said contact arm, means to supply separate electrical pulses to said rotary selecting drive and said vertical drive, the rotary and vertical drives being responsive to said separate electrical pulses to select a given contact and drive said arm into engagement therewith, each of the said switches fitted into said board through a major aperture with the contacts thereof fitted into said minor apertures and the contact arm connected to a further board conductive path.

2. The system of claim 1, wherein the said board includes a plurality of laminations of insulating material and networks of conductive paths with each path individual to common contacts of each switch position such an input lead to a switch can be selectively connected to one or all of the switches through common contacts thereof and thereby to output leads connected to the individual contact arms of the individual switches.

3. The system of claim 1, wherein each switch includes in its rotary drive a single coil and a means responsive to individual pulses of electrical energy to step said switch one contact position per pulse and the vertical drive includes a single coil and plunger mechanism to drive said contact arm into engagement responsive to a single pulse and there is further included a latching mechanism connected to said plunger mechanism and operable responsive to said arm being driven into engagement to hold said contact arm in engagement with a selected contact in the absence of pulses.

4. The system of claim 3, wherein the vertical drive and latching mechanism include a further member connected to said latching mechanism and operable upon the input of a subsequent pulse to said vertical drive to disengage said latching mechanism and restore said contact arm out of engagement with a contact.

5. An improved selecting switch including a contact arm and a contact, circuit means to connect said arm and contact to distinct circuit paths which are in turn interconnected by closure of said arm and contact, a vertical drive mechanism including movable plungers held apart by a spring member and a fixed core with plungers and core of magnetically permeable material, the contact arm being connected to one plunger, means driving said plungers with a first pulse of magnetomotive force toward said core and into engagement with each other, a latch means operating responsive to plunger movement to hold said one plunger and the contact arm in position to effect a connection between arm and contact, the air gap spacing between the core and the other plunger and the air gap spacing between the plungers then being such that a second pulse of magnetomotive force will drive said plunger to free said latch means and release said one plunger, means for then driving said one plunger and the arm to break contact between arm and contact.

6. The switch of claim 5, including a plurality of contacts and another movable plunger, a ratchet mechanism disposed to drive said arm in rotary steps responsive to pulses of magnetomotive force to select a given contact position prior to the operation of said vertical drive mechanism.

7. An improved selecting switch including a contact arm, first drive means responsive to electrical pulses driving the contact arm in rotary movement in a fixed step per pulse, contacts having a position disposed out of the rotary travel of said contact arm, second drive means driving said arm into engagement with a selected one of said contacts responsive to an electrical pulse, a biasing spring, latching means associated with said second drive means holding said arm in engagement with said selected contact following cessation of said second mentioned pulse and against said bias spring tending to drive the arm out of engagement with said contact, releasing means linked to said second driving means releasing said latching means responsive to a further electrical pulse applied to said second driving means whereby the contact arm is restored out of engagement with the selected contact.

8. The switch of claim 7, wherein said first and second driving means each include single coils.

9. The switch of claim 7, wherein the recited means are sealed in a protective casing.

10. The switch of claim 9, wherein the contacts extend from the casing in a given pattern and there is included a circuit carrying board member having a plurality of apertures in a pattern like that of said given pattern, a conductive path extending from said contact arm through said casing to engage a further aperture in said circuit carrying board member and serve as a signal path.

11. The switch of claim 10, wherein the said conductive path includes a brush engaging a movable shaft in contact with said contact arm.

12. The switch of claim 7, wherein said contact arm is formed of a conductive member having a spring portion to effect a resilient engagement with a contact to assure a good electrical connection.

13. The switch of claim 7, wherein the said contact arm includes two conductive members having spring portions biased together so as to be driven apart by engagement with a contact to assure a good electrical connection.

14. An improved electro-mechanical device for effecting an interconnection between circuit paths including a resilient spring arm, means in said device to drive said arm in a given movement, the said arm including two spring members biased inwardly each having tapered portions at their ends forming a cup shaped contact surface, a contact pin spaced from and secured relative to said spring members, said pin having its upper end beveled to fit within the arm cup shaped contact surface, said means for driving said arm operating to force said spring members and the contact surface thereof to engage the pin upper end and wipe along said pin whereby said spring members are deflected and loaded to press against said pin to maintain good contact.

15. An improved electro-mechanical drive adapted to position a driven member in two exact positions responsive to two similar pulses of electrical current, comprising in combination, a coil adapted to be connected to a pulse power source, a first plunger, second plunger and core of magnetically permeable material positioned in the electro-magnetic axis of said coil by a means permitting plunger movement relative to said core, said first plunger and said core having an air gap therebetween prior to the first pulse energization means positioning said plungers to define a second air gap therebetween smaller than the first mentioned air gap between the first plunger and the core prior to the first pulse energization, latching means holding said plungers to define an air gap therebetween greater than the air gap between the first plunger and the core following the first pulse energization, means connected to the second plunger to free said latching means upon said second plunger being driven by a second pulse energization, and means driving said second plunger to its original position of air gap spacing.

16. The drive of claim 15, including an electrical contact arm connected to said second plunger to be driven thereby in the second plunger movement, a contact member spaced from said contact arm in the path of travel thereof to be engaged and disengaged thereby to make or break electrical circuits therebetween.

17. The drive of claim 16, including means linked to said contact arm for stepping said arm in a rotary movement to select a contact member, a plurality of contact members disposed in circular fashion spaced apart from said arm along a radius equal to that of the rotary path of travel of said contact arm.

18. An improved electro-mechanical drive adapted to position a driven member in one of a number of exact positions of rotary movement responsive to pulses of electrical current, comprising in combination, a coil adapted to be connected to a pulse power source, a plunger of magnetically permeable material adapted to be driven by energization of said coil, the said plunger being positioned in the electro-magnetic axis of said coil by means permitting plunger movement relative thereto, means disposed from said plunger and linked thereto to rotate said plunger a fixed step responsive to plunger upward movement and to return said plunger to its original rotary position responsive to downward movement, means biasing said plunger downwardly, means linked to a driven member and means secured to said plunger, each of the means linked to a driven member and the means secured to said plunger including complementary teeth for mutual engagement to accurately position said plunger to control the rotary movement of plunger and driven member to a fixed step.

19. The drive of claim 18 further including a shaft carrying a contact arm and means linked to said plunger to drive said contact arm in rotary movement.

20. The drive of claim 19 further including a plurality of contact pins spaced from said contact arm and positioned such that each rotary movement of a fixed step places said contact arm over a given contact pin.

No references cited.

BERNARD A. GILHEANY, *Primary Examiner.*

T. D. MACBLAIN, *Assistant Examiner.*